United States Patent
Dalal et al.

(10) Patent No.: US 10,248,523 B1
(45) Date of Patent: Apr. 2, 2019

(54) SYSTEMS AND METHODS FOR PROVISIONING DISTRIBUTED DATASETS

(71) Applicant: Veritas Technologies LLC, Mountain View, CA (US)

(72) Inventors: Chirag Dalal, Pune (IN); Vaijayanti Bharadwaj, Pune (IN); Sujit Shembavnekar, Pune (IN); Vinay Sharma, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 284 days.

(21) Appl. No.: 15/230,253

(22) Filed: Aug. 5, 2016

(51) Int. Cl.
*G06F 17/00* (2006.01)
*G06F 11/263* (2006.01)
*G06F 3/06* (2006.01)

(52) U.S. Cl.
CPC ............ *G06F 11/263* (2013.01); *G06F 3/064* (2013.01); *G06F 3/065* (2013.01); *G06F 3/067* (2013.01); *G06F 3/0619* (2013.01); *G06F 3/0631* (2013.01); *G06F 3/0644* (2013.01)

(58) Field of Classification Search
None
See application file for complete search history.

(56) References Cited

U.S. PATENT DOCUMENTS

| | | | | |
|---|---|---|---|---|
| 8,930,312 B1* | 1/2015 | Rath | .................. | G06F 17/30575 707/634 |
| 9,684,472 B2* | 6/2017 | Bish | .................... | H04L 67/1095 |
| 9,733,869 B1* | 8/2017 | Fan | ........................ | G06F 3/0665 |
| 2012/0047499 A1* | 2/2012 | Krzystofczyk | ........... | G06F 8/63 717/174 |
| 2012/0137095 A1* | 5/2012 | Grube | .................. | G06F 12/0638 711/162 |
| 2012/0246158 A1* | 9/2012 | Ke | ..................... | G06F 17/30463 707/736 |
| 2014/0067810 A1* | 3/2014 | Wisnovsky | ....... | G06F 17/30584 707/737 |

(Continued)

OTHER PUBLICATIONS

Apache Cassandra; Retrieved from http://cassandra.apache.org/ on Aug. 11, 2016; Mar. 11, 2010.

(Continued)

*Primary Examiner* — Hung D Le
(74) *Attorney, Agent, or Firm* — FisherBroyles, LLP

(57) ABSTRACT

The disclosed computer-implemented method for provisioning distributed datasets may include (1) identifying a dataset, where a production cluster stores a primary instance of the dataset by distributing data objects within the dataset across the production cluster according to a first partitioning scheme, (2) receiving a request for a testing instance of the dataset on a testing cluster, where the testing cluster is to distribute storage of data objects across the testing cluster according to a second partitioning scheme, (3) locating a copied instance of the dataset, (4) partitioning the copied instance of the dataset according to the second partitioning scheme, thereby generating a plurality of partitions, and (5) providing the testing instance of the dataset by providing storage access for each node within the testing cluster to a corresponding partition within the plurality of partitions. Various other methods, systems, and computer-readable media are also disclosed.

20 Claims, 5 Drawing Sheets

(56) References Cited

U.S. PATENT DOCUMENTS

| | | | | |
|---|---|---|---|---|
| 2015/0134626 A1* | 5/2015 | Theimer | ........... | G06F 17/30289 |
| | | | | 707/693 |
| 2015/0134796 A1* | 5/2015 | Theimer | ........... | G06F 17/30569 |
| | | | | 709/223 |
| 2015/0363450 A1* | 12/2015 | Lee | ................... | G06F 17/30592 |
| | | | | 707/754 |
| 2015/0363464 A1* | 12/2015 | Alves | ................ | G06F 17/30448 |
| | | | | 707/765 |
| 2016/0357648 A1* | 12/2016 | Keremane | ........... | G06F 11/2069 |
| 2017/0060918 A1* | 3/2017 | Iyer | ..................... | G06F 21/6218 |
| 2017/0262521 A1* | 9/2017 | Cho | .................. | G06F 17/30598 |

OTHER PUBLICATIONS

Laura Ripple, et al; Systems and Methods for Enabling Users to Select Databases; U.S. Appl. No. 15/195,143, filed Jun. 28, 2016.
Tim Haynes; Systems and Methods for Navigating Through a Hierarchy of Nodes Stored in a Database; U.S. Appl. No. 14/480,558, filed Sep. 8, 2014.
Karl Woodrow, et al; Systems and Methods for Utilizing Information-Asset Metadata Aggregated from Multiple Disparate Data-Management Systems; U.S. Appl. No. 14/483,136, filed Sep. 10, 2014.

* cited by examiner

SYSTEMS AND METHODS FOR PROVISIONING DISTRIBUTED DATASETS

BACKGROUND

In the digital age, organizations increasingly rely on digitally-stored data. Furthermore, organizations are increasingly using very large data sets for various applications. Continuing improvements in storage technology mean that many of the previous barriers to managing large data sets are disappearing, allowing even relatively small organizations to store and process large databases. In some cases, scale-out high performance databases serving live applications may store petabytes of data across tens of thousands of nodes.

However, as distributed storage techniques facilitate the explosive growth of production data sets, traditional systems may leave associated costs with very large data sets unaddressed. For example, various secondary uses of production data sets (e.g., backing up the data sets, using the data sets for developing new features for primary applications, etc.) may impose costs on production systems (potentially adversely affecting the performance of the primary applications that make use of the data sets) and/or on the computational infrastructure used to provide production data sets to secondary applications. In addition, secondary applications themselves may suffer performance issues as the time required to provide access to the data sets increases.

The instant disclosure, therefore, identifies and addresses a need for systems and methods for provisioning distributed datasets.

SUMMARY

As will be described in greater detail below, the instant disclosure describes various systems and methods for provisioning distributed datasets by making distributed datasets available in different and/or scaled-down cluster configurations without additional data movement and/or data copy operations.

In one example, a computer-implemented method for provisioning distributed datasets may include (i) identifying a dataset, where a production cluster stores a primary instance of the dataset by distributing data objects within the dataset across the production cluster according to a first partitioning scheme that assigns each data object within the dataset to a corresponding node within the production cluster, (ii) receiving a request for a testing instance of the dataset on a testing cluster, where the testing cluster is to distribute storage of data objects across the testing cluster according to a second partitioning scheme that maps data objects to corresponding nodes within the testing cluster, (iii) locating, in response to the request, a copied instance of the dataset that is derived from the primary instance of the dataset and that is stored outside both the production cluster and the testing cluster, (iv) partitioning the copied instance of the dataset according to the second partitioning scheme, thereby generating a group of partitions of data objects that map to corresponding nodes within the testing cluster, and (v) providing the testing instance of the dataset in response to the request by providing storage access for each node within the testing cluster to a corresponding partition within the partitions without copying the copied instance of the dataset to the testing cluster.

In some examples, the computer-implemented method may further include executing a test application that uses the testing instance of the dataset.

In some examples, providing the testing instance of the dataset may include providing the testing cluster with access to the dataset without providing the testing cluster with access to the production cluster.

In one embodiment, the copied instance of the dataset is stored at a copy data management appliance that copied the dataset from the production cluster.

In one embodiment, the computer-implemented method may further include (i) receiving, from an application that uses the testing instance of the dataset, a write operation to apply to a data location within the testing instance of the dataset, (ii) applying the write operation to an intermediate data layer instead of applying the write operation to the copied instance of the dataset, (iii) receiving, from an application that uses the testing instance of the dataset, a read operation directed to the data location, and (iv) applying the read operation to the intermediate data layer instead of applying the read operation to the copied instance of the dataset based on the write operation having previously been applied to the data location.

In some examples, partitioning the copied instance of the dataset may include: (i) identifying a token space that describes a range of tokens derivable from data objects given a tokening scheme that maps each data object to a corresponding token, (ii) dividing the token space into a group of token space partitions based on a number of nodes within the testing cluster, (iii) assigning each token space partition to a corresponding node within the testing cluster, and (iv) determining, for each data object within the copied instance of the dataset, to which token space partition the data object belongs based on a token derived from the data object.

In one embodiment, the copied instance of the dataset may include a snapshot of the primary instance of the dataset taken from the production cluster.

In some examples, the computer-implemented method may further include performing a backup of the dataset from the snapshot, thereby performing both the backup and providing the testing instance of the dataset with only one act of reading the dataset from the production cluster and only one act of writing the dataset outside the production cluster.

In some examples, providing storage access for each node within the testing cluster to a corresponding partition within the partitions without copying the copied instance of the dataset to the testing cluster may include encapsulating, for each given partition within the partitions, data objects that fall within the given partition in a corresponding virtual disk and attaching the corresponding virtual disk to a corresponding node within the testing cluster.

In some examples, providing storage access for each node within the testing cluster to a corresponding partition within the partitions without copying the copied instance of the dataset to the testing cluster may include exporting, for each given partition within the partitions, data objects that fall within the given partition as a corresponding distributed file system share and mounting the corresponding distributed file system share at a corresponding node within the testing cluster.

In one embodiment, the dataset may include a subset of a total dataset stored by the production cluster and identifying the dataset may include applying a selection criterion to the total dataset.

In one embodiment, a system for implementing the above-described method may include (i) an identification module, stored in memory, that identifies a dataset, where a production cluster stores a primary instance of the dataset by distributing data objects within the dataset across the production cluster according to a first partitioning scheme that assigns each data object within the dataset to a corresponding node within the production cluster, (ii) a receiving module, stored in memory, that receives a request for a testing instance of the dataset on a testing cluster, where the testing cluster is to distribute storage of data objects across the testing cluster according to a second partitioning scheme that maps data objects to corresponding nodes within the testing cluster, (iii) a location module, stored in memory, that locates, in response to the request, a copied instance of the dataset that is derived from the primary instance of the dataset and that is stored outside both the production cluster and the testing cluster, (iv) a partitioning module, stored in memory, that partitions the copied instance of the dataset according to the second partitioning scheme, thereby generating a group of partitions of data objects that map to corresponding nodes within the testing cluster, (v) a providing module, stored in memory, that provides the testing instance of the dataset in response to the request by providing storage access for each node within the testing cluster to a corresponding partition within the partitions without copying the copied instance of the dataset to the testing cluster, and (vi) at least one physical processor configured to execute the identification module, the receiving module, the location module, the partitioning module, and the providing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a dataset, where a production cluster stores a primary instance of the dataset by distributing data objects within the dataset across the production cluster according to a first partitioning scheme that assigns each data object within the dataset to a corresponding node within the production cluster, (ii) receive a request for a testing instance of the dataset on a testing cluster, where the testing cluster is to distribute storage of data objects across the testing cluster according to a second partitioning scheme that maps data objects to corresponding nodes within the testing cluster, (iii) locate, in response to the request, a copied instance of the dataset that is derived from the primary instance of the dataset and that is stored outside both the production cluster and the testing cluster, (iv) partition the copied instance of the dataset according to the second partitioning scheme, thereby generating a group of partitions of data objects that map to corresponding nodes within the testing cluster, and (v) provide the testing instance of the dataset in response to the request by providing storage access for each node within the testing cluster to a corresponding partition within the partitions without copying the copied instance of the dataset to the testing cluster.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
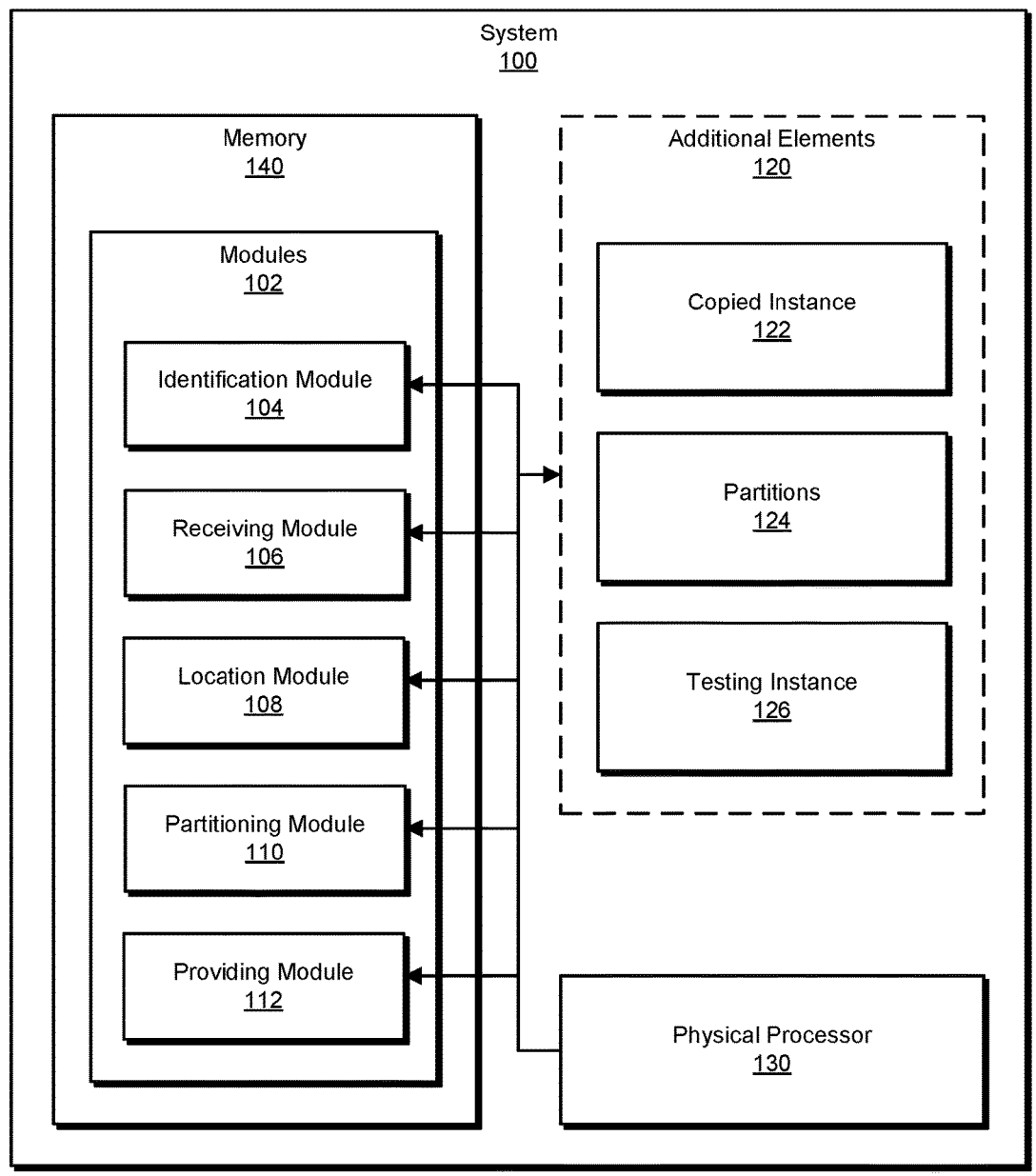
FIG. 1 is a block diagram of an example system for provisioning distributed datasets.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for provisioning distributed datasets. As will be described in greater detail below, by making distributed datasets available in different and/or scaled-down cluster configurations without additional data movement and/or data copy operations, the systems and methods described herein may quickly provide access to a dataset without burdening a production system that uses the dataset and without consuming additional computational resources such as storage and network bandwidth. For example, these systems and methods may map an already existing copy of a data set (e.g., created and/or maintained for backing up the data set) originally taken from a production cluster to a secondary cluster (e.g., that differs from the production cluster) and provide access for the secondary cluster to the already existing copy of the data set according to the mapping, thereby creating an environment in which the data set can be consumed without additional input/output burden on the production environment.

By provisioning datasets without performing additional input/output operations production storage clusters, the systems and methods described herein may improve the functioning of production storage clusters (e.g., by improving the responsiveness of production storage clusters for primary applications). In addition, by quickly provisioning datasets for the use of secondary applications, these systems and methods may improve the functioning of secondary computing systems to execute secondary applications more responsively. Furthermore, by provisioning datasets without requiring additional data copy and/or data movement operations (e.g., from data copy management appliances to secondary clusters), the systems described herein may improve the functioning of data copy management appliances and secondary clusters by reducing storage consumption, storage bandwidth consumption and/or network bandwidth consumption on these computing systems.

Figure 2:
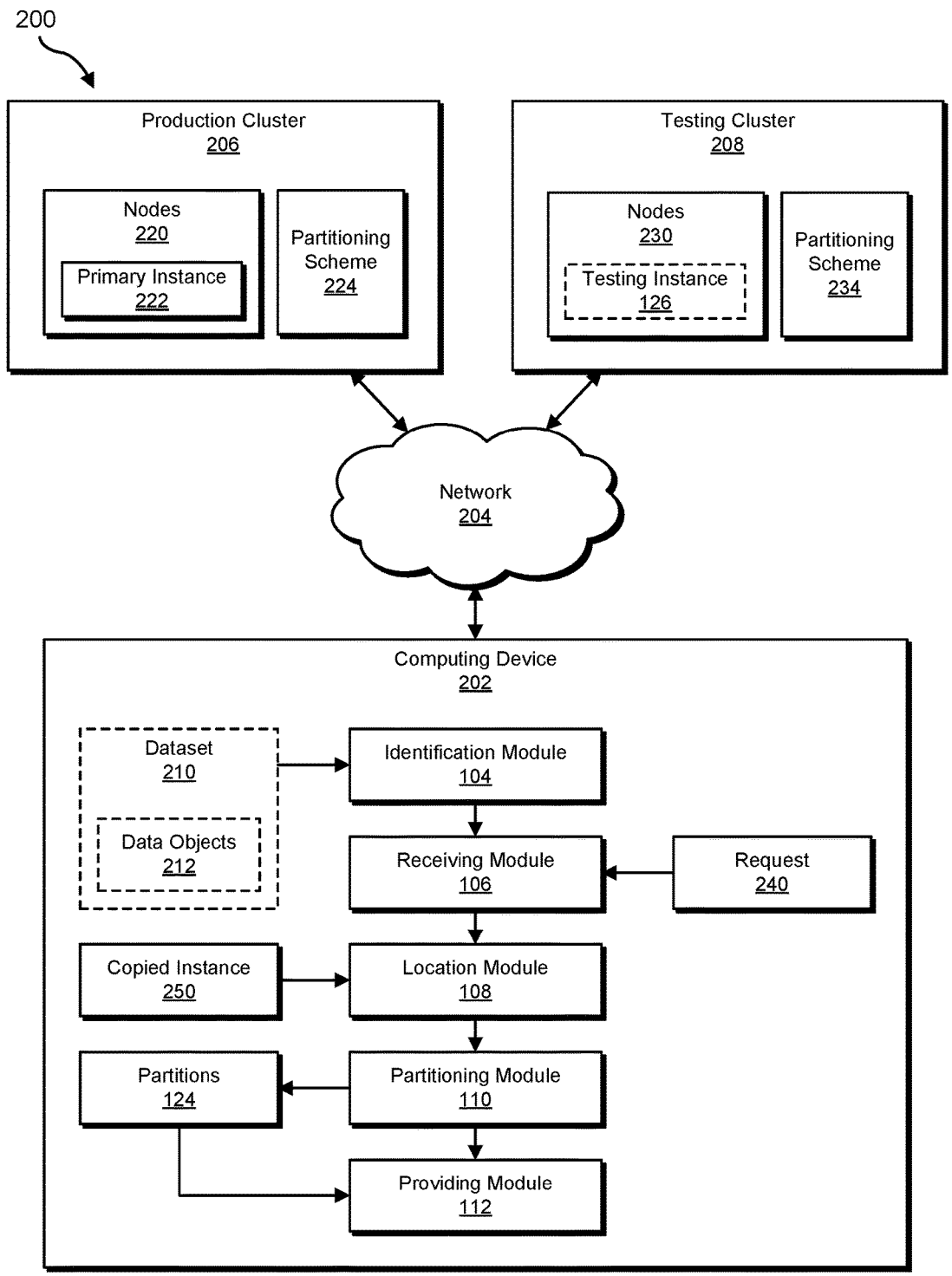
FIG. 2 is a block diagram of an additional example system for provisioning distributed datasets.
Figure 3:
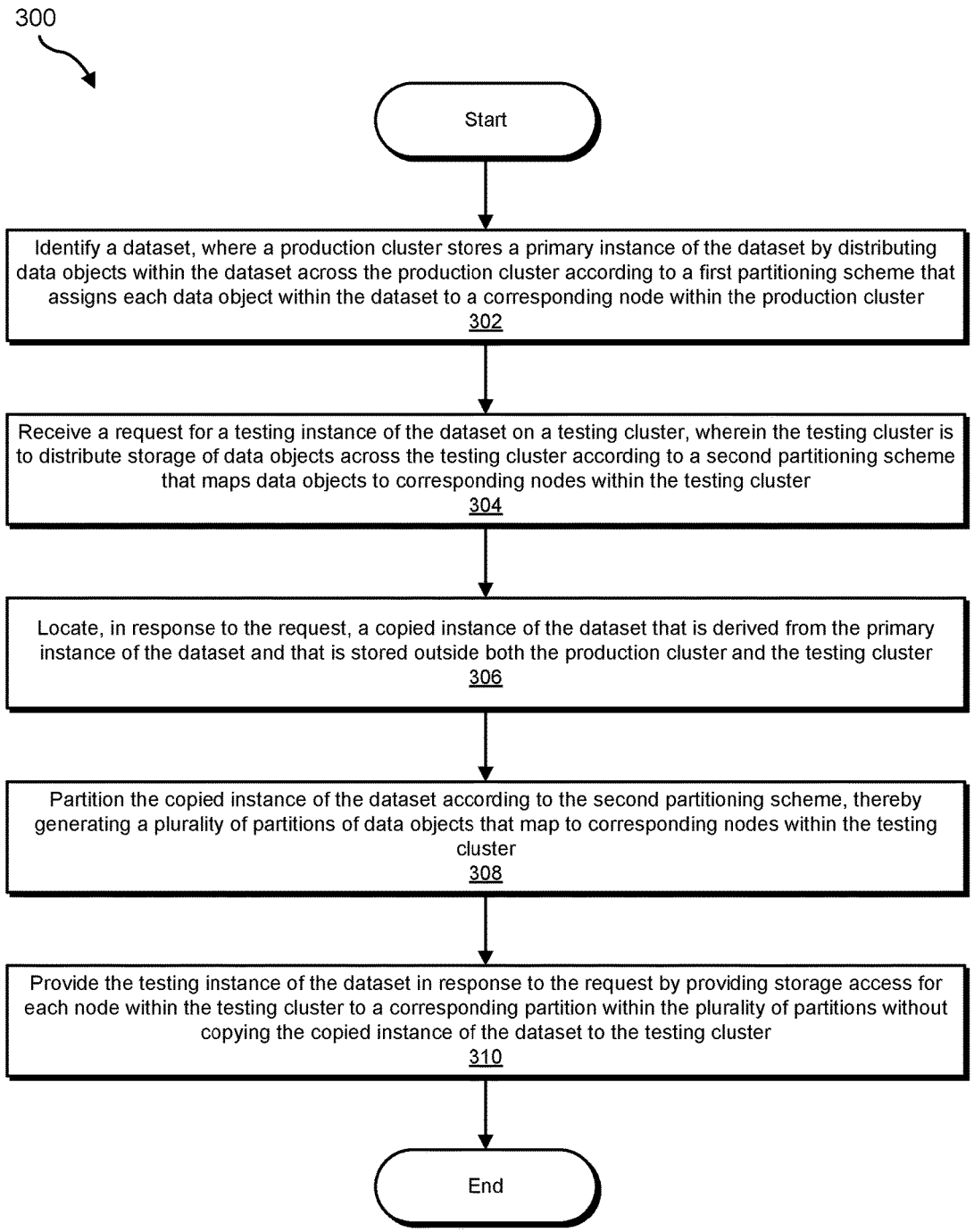
FIG. 3 is a flow diagram of an example method for provisioning distributed datasets.
Figure 4:
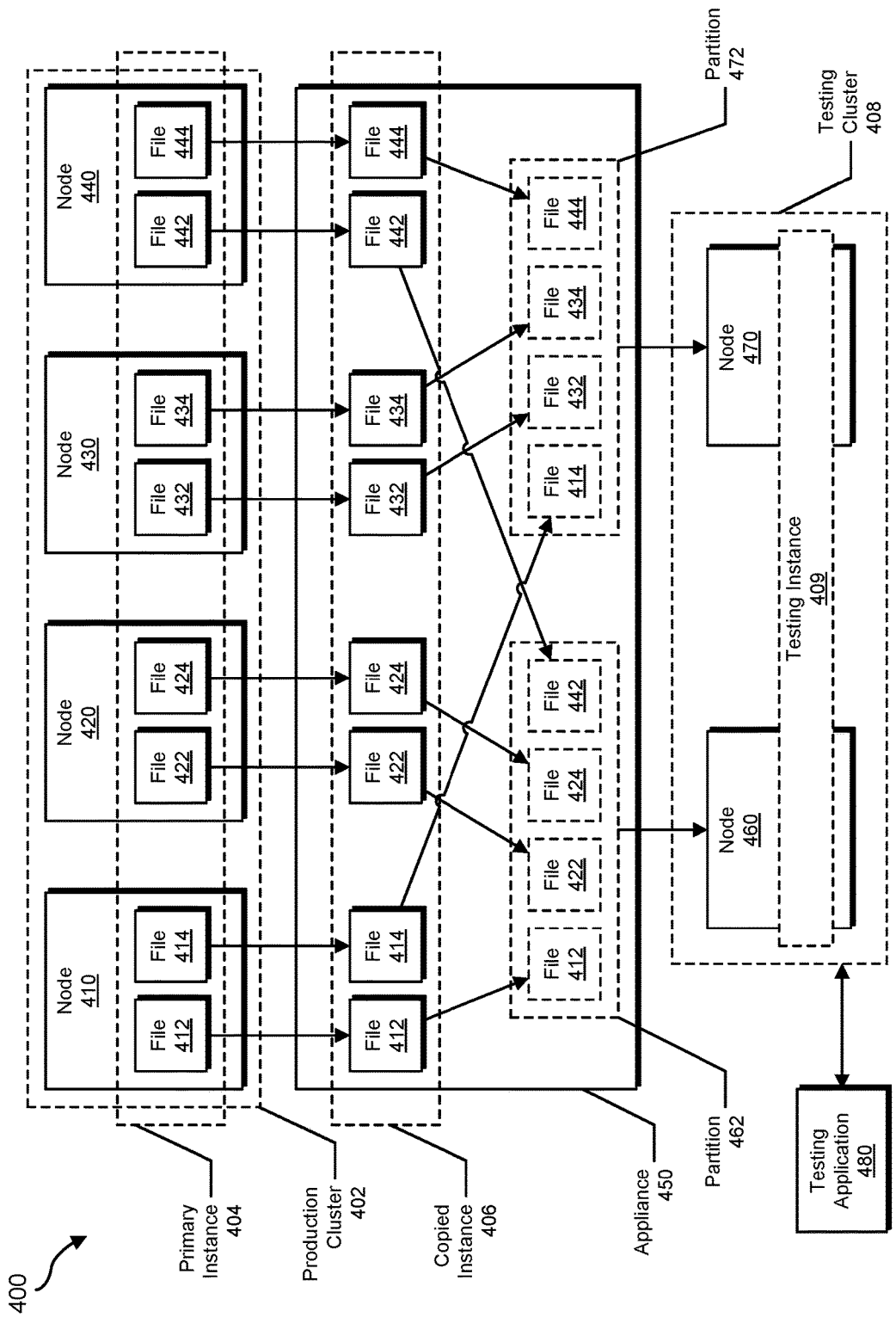
FIG. 4 is a block diagram of an exemplary computing system for provisioning distributed datasets.

The following will provide, with reference to FIGS. 1, 2, and 4, detailed descriptions of example systems for provisioning distributed datasets. Detailed descriptions of corresponding computer-implemented methods will also be provided in connection with FIG. 3. In addition, detailed descriptions of example partitionings of token spaces will be provided in connection with FIG. 5.

FIG. 1 is a block diagram of exemplary system 100 for provisioning distributed datasets. As illustrated in this figure, exemplary system 100 may include one or more modules 102 for performing one or more tasks. For example, and as will be explained in greater detail below, exemplary system 100 may include an identification module 104 that identifies a dataset, where a production cluster stores a primary instance of the dataset by distributing data objects within the dataset across the production cluster according to a first partitioning scheme that assigns each data object within the dataset to a corresponding node within the production cluster. Exemplary system 100 may additionally include a receiving module 106 that receives a request for a testing instance of the dataset on a testing cluster, where the testing cluster is to distribute storage of data objects across the testing cluster according to a second partitioning scheme that maps data objects to corresponding nodes within the testing cluster. Exemplary system 100 may also include a location module 108 that locates, in response to the request, a copied instance of the dataset that is derived from the primary instance of the dataset and that is stored outside both the production cluster and the testing cluster. Exemplary system 100 may additionally include a partitioning module 110 that partitions the copied instance of the dataset according to the second partitioning scheme, thereby generating a plurality of partitions of data objects that map to corresponding nodes within the testing cluster. Exemplary system 100 may also include a providing module 112 that provides the testing instance of the dataset in response to the request by providing storage access for each node within the testing cluster to a corresponding partition within the plurality of partitions without copying the copied instance of the dataset to the testing cluster. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, production cluster 206, and/or testing cluster 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate provisioning distributed datasets. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements, such as additional elements 120. In one example, additional elements may include a copied instance 122 of a dataset. For example, copied instance 122 may represent a snapshot, a backup, and/or a mirror of a dataset (e.g., from a production environment). In one example, partitions 124 may represent a designation and/or mapping of how a dataset (e.g., copied instance 122) may be divided and provisioned across a cluster of nodes. In some examples, a testing instance 126 may represent a logical representation of a dataset that has been provisioned to a cluster of nodes (e.g., while deriving the underlying data from copied instance 122 and without making a full copy of the dataset separately from copied instance 122).

Example system 100 in FIG. 1 may be implemented in a variety of ways. For example, all or a portion of example system 100 may represent portions of example system 200 in FIG. 2. As shown in FIG. 2, system 200 may include a computing device 202, a production cluster 206, a testing cluster 208 in communication via a network 204. In one example, all or a portion of the functionality of modules 102 may be performed by computing device 202, production cluster 206, testing cluster 208, and/or any other suitable computing system. As will be described in greater detail below, one or more of modules 102 from FIG. 1 may, when executed by at least one processor of computing device 202, production cluster 206, and/or testing cluster 208, enable computing device 202, production cluster 206, and/or testing cluster 208 to provision distributed datasets.

Computing device 202 generally represents any type or form of computing device capable of reading computer-executable instructions. In one example, computing device 202 may represent a copy data management appliance (e.g., that creates a copy, mirror, snapshot, and/or backup of a dataset from a production environment). Additional examples of computing device 202 include, without limitation, media servers, desktops, servers, laptops, tablets, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Production cluster 206 generally represents any type or form of computing system that is capable of storing, managing, and/or using datasets. In one example, production cluster 206 may represent a cluster of nodes (e.g., nodes 220) across which responsibility for storing and/or providing storage access for portions of a dataset is distributed. In some examples, production cluster 206 may store a primary instance of a dataset (e.g., a primary instance 222) that is used by one or more primary applications. Additional examples of production cluster 206 include, without limitation, storage servers, database servers, application servers, and/or web servers configured to run certain software applications and/or provide various storage, database, and/or web services. Although illustrated as a single entity in FIG. 2, production cluster 206 may include and/or represent a plurality of servers that work and/or operate in conjunction with one another.

Testing cluster 208 generally represents any type or form of computing system that is capable of managing and/or using datasets. In one example, testing cluster 208 may represent a cluster of nodes (e.g., nodes 230) across which responsibility for providing storage access for portions of a dataset is distributed. In some examples, testing cluster 208 may provide access to a testing instance of a dataset (e.g., a testing instance 126) that is used by one or more secondary applications (e.g., to provide a test and development environment for one or more test and development applications). Additional examples of testing cluster 208 include, without limitation, storage servers, database servers, application servers, and/or web servers configured to run certain software applications and/or provide various storage, database, and/or web services. Although illustrated as a single entity in FIG. 2, testing cluster 208 may include and/or represent a plurality of servers that work and/or operate in conjunction with one another.

Network 204 generally represents any medium or architecture capable of facilitating communication or data transfer. In one example, network 204 may facilitate communication between computing device 202, production cluster 206, and/or testing cluster 208. In this example, network 204 may facilitate communication or data transfer using wireless and/or wired connections. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for provisioning distributed datasets. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a dataset, where a production cluster stores a primary instance of the dataset by distributing data objects within the dataset across the production cluster according to a first partitioning scheme that assigns each data object within the dataset to a corresponding node within the production cluster. For example, identification module 104 may, as part of computing device 202 in FIG. 2, identify dataset 210, where production cluster 206 stores primary instance 222 of dataset 210 by distributing data objects 212 within dataset 210 across production cluster 206 according to a partitioning scheme 224 that assigns each data object within dataset 210 to a corresponding node (e.g., one of nodes 220) within production cluster 206.

The term "dataset," as used herein, generally refers to any collection of data that may be stored across a distributed storage system. In some examples, the dataset may include a collection of data objects formatted for storage by a distributed storage system. For example, a distributed database management system may store a distributed database as a collection of files that are externally arranged (e.g., stored with particular file names and/or at particular locations) and/or internally structured according to a specification of the distributed database. In some examples, the term "dataset" may refer to the contents of a database and/or a selected portion of the contents of a database. In some examples, the dataset may include a NoSQL database and/or a non-relational database. Examples of a dataset may include, without limitation, an APACHE CASSANDRA database. As used herein, the term "data object" may refer to any item of data that is capable of storage by a storage system. Examples of data objects may include, without limitation, file system objects (e.g., files) and database elements.

In some examples, one or more systems described herein may create, storage, manage, and/or provide logical representations of multiple instances of a dataset. As used herein, the term "instance" may refer to any copy, version, and/or logical representation of a dataset. For example, a primary instance of a dataset may represent an original instance of a dataset (e.g., from which one or more additional instances of the dataset are ultimately derived) and/or may represent an instance of a dataset used by one or more primary applications in a production environment (e.g., an environment in which the dataset is modified by one or more primary applications). In another example, a copied instance of a dataset may represent an instance of a dataset derived from another instance of a dataset (e.g., from a primary instance of a dataset). For example, a copied instance of a dataset may be derived from a backup and/or mirror of a primary dataset. In some examples, as will be described in greater detail below, one or more of the systems described herein may present a logical instance of a dataset (e.g., an instance of the dataset that does not represent a complete separate copy of the dataset, but which represents a logical mapping to one or more existing instances of the dataset).

The term "cluster," as used herein, generally refers to any group of interconnected computing systems configured to collectively provide a service and/or share a computational load. For example, the term cluster may refer to a group of interconnected computing systems that run a distributed database manager and/or that collectively store, manage, and/or provide access to a distributed database. For example, a cluster of nodes may receive a data access request and may forward the data access request to the node in the cluster responsible for storage of the requested data.

The term "production cluster," as used herein, generally refers to a cluster operating in a production environment. Accordingly, the production cluster may provide one or more data storage services to one or more primary and/or production applications. In some examples, the production cluster may be subject to one or more data copy operations. For example, an appliance (e.g., a data copy management system) may copy, mirror, and/or snapshot data stored on the production cluster.

The term "partitioning scheme," as used herein, generally refers to any scheme for partitioning elements of a dataset into subsets and/or allocating such subsets to nodes within a cluster. As will be explained in greater detail below, in some examples, a partitioning scheme may include partitioning a token space, where data objects may be mapped to tokens and data objects may be assigned to partitions (and thus, e.g., to nodes corresponding to the partitions) based on the partition of the token space into which the token of each data object falls. In some examples, the partitioning scheme may randomly distribute tokens in the token space to token partitions. Additionally or alternatively, the partitioning scheme may divide the token space into contiguous ranges of tokens.

Identification module 104 may identify the dataset in any of a variety of contexts. For example, identification module 104 may identify the dataset from a data copy management appliance (e.g., that has created and/or maintains a copied instance of the dataset). Additionally or alternatively, identification module 104 may identify the dataset from a testing cluster that will make use of a testing instance of the dataset.

Identification module 104 may identify the dataset in any suitable way. For example, identification module 104 may receive an instruction identifying the dataset directly (e.g., by a name and/or unique identifier). Additionally or alternatively, identification module 104 may receive an instruction identifying the production cluster that hosts a primary instance of the dataset. In some examples, identification module 104 may receive an instruction identifying a copied instance of the dataset (e.g., at an appliance that creates and/or maintains the copied instance). In some examples, the production cluster may maintain a superset of data that includes the dataset, and identification module 104 may distinctly identify that portion of the superset of data that makes up the dataset. Accordingly, in one example, the dataset may represent a subset of a total dataset stored by the production cluster and identifying the dataset may include applying a selection criterion to the total dataset. For example, identification module 104 may randomly select data from the superset to distinctly identify the dataset. In some examples, the selection criterion may indicate what proportion of the superset is to be used to identify the dataset. Additionally or alternatively, the selection criterion may indicate a target size of the dataset (e.g., a size that may be smaller than the size of the superset). In some examples, the selection criterion may specify data characteristics according to which elements of the superset may be selected to form the dataset. Accordingly, in some examples, identification module 104 may select all data elements within the superset that match the data characteristics. Additionally or alternatively, identification module 104 may select enough data elements that match the data characteristics to meet a weighting criterion.

To illustrate the operation of identification module 104 in an example environment, FIG. 4 shows an example system 400. As shown in FIG. 4, example system 400 may include a production cluster 402 with nodes 410, 420, 430, and 440. Example system 400 may also include an appliance 450 in communication with production cluster 402. In addition, example system 400 may include a testing cluster 408 with nodes 460 and 470 and in communication with appliance 450. In one example, identification module 104 may (e.g., as a part of appliance 450 and/or testing cluster 408) identify a dataset stored by production cluster 402 and copied to appliance 450 (e.g., represented by a primary instance 404 and a copied instance 406, respectively). As shown in FIG. 4, files 412, 414, 422, 424, 432, 434, 442, and 444 of primary instance 404 may be distributed across production cluster 402, each file being assigned to a node.

Returning to FIG. 3, at step 304, one or more of the systems described herein may receive a request for a testing instance of the dataset on a testing cluster, where the testing cluster is to distribute storage of data objects across the testing cluster according to a second partitioning scheme that maps data objects to corresponding nodes within the testing cluster. For example, receiving module 106 may, as part of computing device 202 in FIG. 2, receive a request 240 for testing instance 126 of dataset 210 on testing cluster 208, where testing cluster 208 is to distribute storage of data objects 210 across testing cluster 208 according to a partitioning scheme 234 that maps data objects 210 to corresponding nodes 230 within testing cluster 208.

The term "testing instance," as used herein, generally refers to an instance of a dataset provisioned for use (e.g., by one or more applications) outside a production environment. In some examples, the testing instance may include an instance of a dataset used for testing an application to be applied to the production environment and/or that is currently applied to the production environment (e.g., to identify any errors, faults, failure points, and/or security vulnerabilities in the application and/or to test the application for performance, usability, etc.). In some examples, the testing instance may include an instance of a dataset used for developing an application to be applied to the production environment (and/or further developing an application that is currently applied to the production environment)—e.g., by providing representative data for the application in development to consume. In some examples, the testing instance may be derived from a pre-existing instance of the dataset without making a complete separate copy of the pre-existing instance of the dataset. For example, as will be explained in greater detail below, the systems described herein may create the testing instance by creating a logical mapping from a testing cluster to the pre-existing instance of the dataset.

The term "testing cluster," as used herein, generally refers to a cluster separate from the production cluster. In some examples, the testing cluster may use the same distributed database system as the production cluster. In some examples, the testing cluster may include fewer nodes than does the production cluster. Accordingly, as will be described in greater detail below, the systems described herein may repartition an instance of the dataset derived from the production cluster to provision the testing cluster with a testing instance of the dataset according to the repartitioning.

Receiving module 106 may receive the request for the testing instance in any suitable context. For example, receiving module 106 may, as a part of a data copy management system (e.g., that maintains a copied instance of the dataset) receive a request to provision the testing cluster with the dataset. Additionally or alternatively, receiving module 106 may, as part of the testing cluster, identify a request for the dataset.

Receiving module 106 may receive the request in any suitable manner. In some examples, the request may specify one or more characteristics of the testing cluster. For example, the request may specify a number of nodes in the testing cluster. Additionally or alternatively, the request may specify the size of the dataset and/or other characteristics of the dataset (e.g. weights for sampling elements for the dataset from a superset of data on the production cluster).

Example system 400 of FIG. 4 may illustrate the operation of receiving module 106 in an example environment. In one example, receiving module 106 (e.g., operating as a part of testing cluster 408 and/or appliance 450) may receive a request (e.g., from a testing application in communication with testing cluster 408, from testing cluster 408, and/or from a subsystem of appliance 450) for a testing instance 409 of the dataset to be made available on testing cluster 408 according to a partitioning scheme that distributes files 412, 414, 422, 424, 432, 434, 442, and 444 to nodes 460 and 470.

Returning to FIG. 3, at step 306, one or more of the systems described herein may locate, in response to the request, a copied instance of the dataset that is derived from the primary instance of the dataset and that is stored outside both the production cluster and the testing cluster. For example, location module 108 may, as part of computing device 202 in FIG. 2, locate, in response to request 240, copied instance 122 of dataset 210 that is derived from primary instance 222 of dataset 210 and that is stored outside the production cluster 206 and testing cluster 208.

The term "copied instance," as used herein, generally refers to any instance of a dataset that is derived from another instance of the dataset (e.g., a primary and/or original instance of the dataset). In some examples, the copied instance may include a mirror and/or snapshot of the primary instance of the dataset. In some examples, the copied instance of the dataset may be stored at and/or by a data copy management appliance in communication with the production cluster. In one example, the copied instance of the dataset may be stored at a copy data management appliance that copied the dataset from the production cluster. In some examples, the copied instance of the dataset may include a snapshot of the primary instance of the dataset taken from the production cluster.

Location module 108 may locate the copied instance of the dataset in any suitable manner. For example, location module 108 may locate the copied instance of the dataset by identifying a set of data objects (e.g., files) stored on a copy data management appliance. In some examples, location module 108 may locate the copied instance of the dataset by determining that the copied instance represents data copied from the production cluster.

Example system 400 of FIG. 4 may illustrate the operation of location module 108 in an example environment. In one example, location module 108 (e.g., operating as a part of testing cluster 408 and/or appliance 450) may locate copied instance 406 of the dataset on appliance 450.

Returning to FIG. 3, at step 308, one or more of the systems described herein may partition the copied instance of the dataset according to the second partitioning scheme, thereby generating a plurality of partitions of data objects that map to corresponding nodes within the testing cluster. For example, partitioning module 110 may, as part of computing device 202 in FIG. 2, partition copied instance 122 of dataset 210 according to partitioning scheme 234, thereby generating a plurality of partitions 124 of data objects 212 that map to corresponding nodes 230 within testing cluster 208.

Partitioning module 110 may partition the copied instance of the dataset in any of a variety of ways. In some examples, partitioning module 110 may partition the copied instance of the dataset by (i) identifying a token space that describes a range of tokens derivable from data objects given a tokening scheme that maps each data object to a corresponding token, (ii) dividing the token space into a plurality of token space partitions based on a number of nodes within the testing cluster, (iii) assigning each token space partition to a corresponding node within the testing cluster, and (iv) determining, for each data object within the copied instance of the dataset, to which token space partition the data object belongs based on a token derived from the data object. The tokens may derive from the data objects in any of a variety of ways. In some examples, the token of a data object may equal a row key and/or a primary key of the data object. Accordingly, in these examples, the token space may represent the space of possible row key (and/or primary key) values of data objects. Additionally or alternatively, systems described herein may derive the token of a data object from a hash of the data object and/or a portion of the data object (e.g., of a row key and/or primary key of the data object).

In some examples, partitioning module 110 may partition the copied instance of the dataset by identifying an existing partitioning of the dataset and merging existing partitions of the dataset until the number of remaining partitions matches the number of nodes in the testing cluster. In this example, each partition designated by partitioning module 110 may represent a combination of partitions previously defined for distributing data storage on the production cluster.

In some examples, partitioning module 110 may partition the copied instance by providing configuration information for the testing cluster (e.g., the number of nodes in the testing cluster) and/or information describing the dataset to a distributed database management system to determine token ranges for the nodes in the testing cluster. Partitioning module 110 may then partition the copied instance of the dataset according to the token ranges provided by the distributed database management system.

Example system 400 of FIG. 4 may illustrate the operation of partitioning module 110 in an example environment. In one example, partitioning module 110 (e.g., operating as a part of testing cluster 408 and/or appliance 450) may partition copied instance 406 into partitions 462 and 472. Accordingly, partitioning module 110 may create a partitioning different from that of primary instance 404 (e.g., which may be divided into four partitions).

Figure 5:
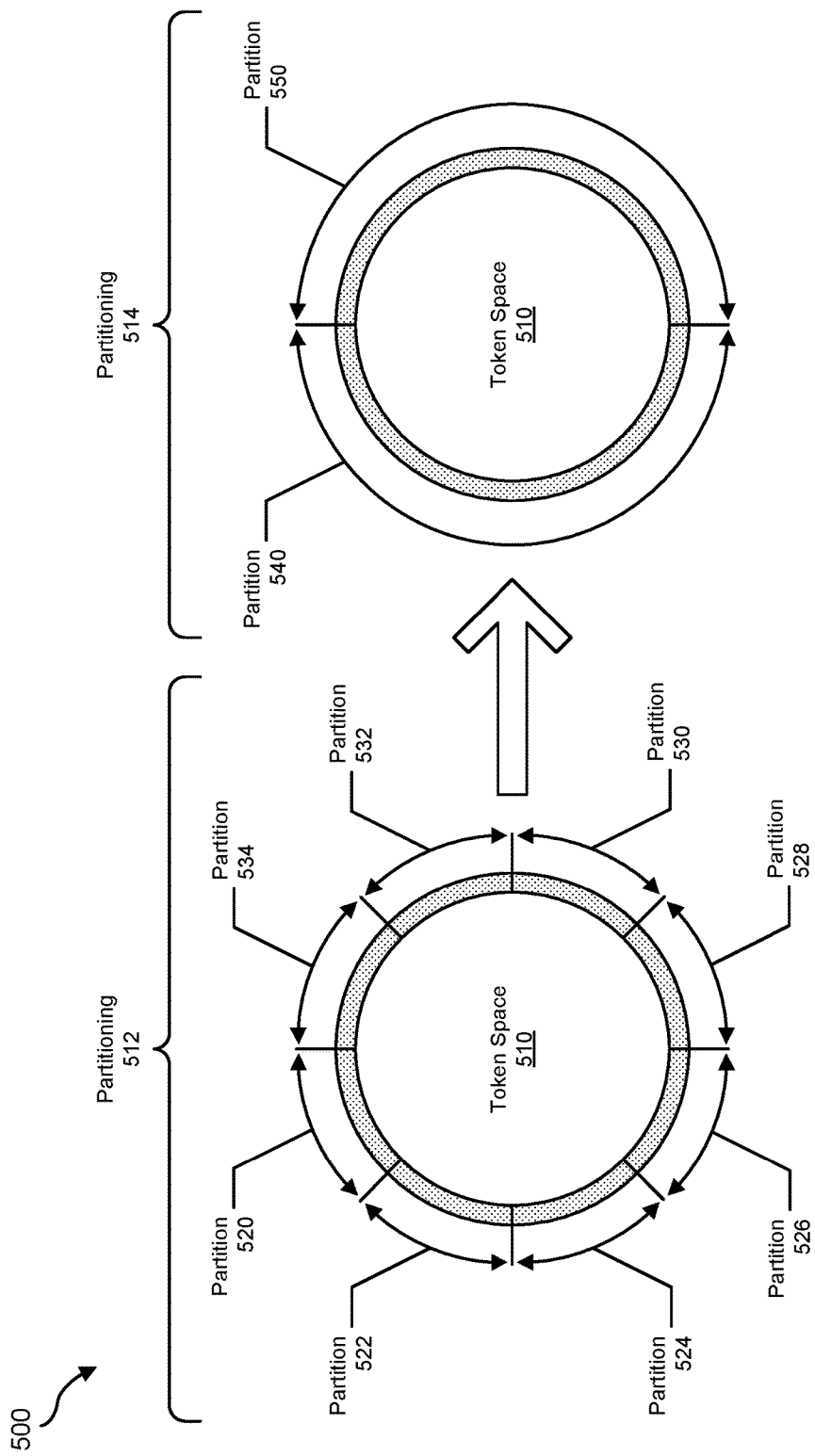
FIG. 5 is an illustration of exemplary token space partitions useful for provisioning distributed datasets.

To further illustrate the operation of partitioning module 110, FIG. 5 shows example partitionings 500. As shown in FIG. 5, a token space 510 may be partitioned according to a partitioning 512 such that token space 510 is divided into eight partitions: partitions 520, 522, 524, 526, 528, 530, 532, and 534 (e.g., reflecting a number of nodes in the production cluster). However, partitioning module 110 may repartition token space 510 according to a partitioning 514 into two partitions: a partition 540 and a partition 550 (e.g., reflecting a number of nodes in a testing cluster). In one example, partitioning module 110 may repartition token space 510 by identifying a target number of partitions (e.g., two) and merging partitions in partitioning 512 to produce two partitions (e.g., merging partitions 520, 522, 524, 526 to produce partition 540 and merging partitions 528, 530, 532, and 534 to produce partition 550).

Returning to FIG. 3, at step 310, one or more of the systems described herein may provide the testing instance of the dataset in response to the request by providing storage access for each node within the testing cluster to a corresponding partition within the plurality of partitions without copying the copied instance of the dataset to the testing cluster. For example, providing module 112 may, as part of computing device 202 in FIG. 2, provide testing instance 126 of dataset 210 in response to request 240 by providing storage access for each of nodes 230 within testing cluster 208 to a corresponding partition within partitions 124 without copying copied instance 122 of dataset 210 to testing cluster 208.

Providing module 112 may provide the testing instance of the dataset in any suitable manner. In some examples, providing module 112 may provide the testing instance of the dataset by providing the testing cluster with access to the dataset without providing the testing cluster with access to the production cluster. For example, providing module 112 may present a logical representation of the testing instance to the testing cluster and the logical representation may reference portions of the copied instance of the dataset. Thus, because in this example providing module 112 neither references data stored on the production cluster nor copies data from the production cluster, the testing cluster may access the dataset without further read operations from or write operations to the production cluster.

In some examples, providing module 112 may provide storage access for each node within the testing cluster to a corresponding partition within the plurality of partitions without copying the copied instance of the dataset to the testing cluster by encapsulating, for each given partition within the plurality of partitions, data objects that fall within the given partition in a corresponding virtual disk and attaching the corresponding virtual disk to a corresponding node within the testing cluster. For example, providing module 112 may identify, within the copied instance of the dataset, the data objects that correspond to a given partition. Providing module 112 may then create a virtual disk that encapsulates the data objects that correspond to the partition. In some examples, each node of the testing cluster may represent and/or host a virtual machine that may connect to the virtual disk corresponding to the partition designated for the corresponding node of the testing cluster. For example, providing module 112 may attach the virtual disk (e.g., residing on an appliance storing the copied instance of the data) across the network (e.g., via a network file system protocol) to a virtual machine on a corresponding node within the testing cluster. Additionally or alternatively, providing module 112 may export, to the corresponding node (e.g., physical machine) in the testing cluster, the encapsulated data objects in the virtual disk through a network-based storage interface protocol such as Internet Small Computer Systems Interface ("iSCSI").

As mentioned above, in some examples, providing module 112 may encapsulate data objects within the copied instance that correspond to a partition for the testing instance in a virtual disk (e.g., without creating a separate copy of the data objects) and create a connection (e.g., a network storage connection) between the virtual disk and a virtual machine on a node of the testing cluster that corresponds to the partition. In these examples, providing module 112 may additionally interpose a differencing virtual disk between the virtual machine and the virtual disk (e.g., on the node of the testing cluster to which the virtual disk is connected). In this manner, attempts by an application on the testing cluster to write to the testing instance of the dataset may be preserved in the differencing virtual disk without modifying the copied instance of the dataset. Accordingly, in some examples, systems and methods described herein (e.g., an execution module) may (i) receive, from an application that uses the testing instance of the dataset, a write operation to apply to a data location within the testing instance of the dataset, (ii) apply the write operation to an intermediate data layer instead of applying the write operation to the copied instance of the dataset, (iii) receive, from an application that uses the testing instance of the dataset, a read operation directed to the data location, and (iv) apply the read operation to the intermediate data layer instead of applying the read operation to the copied instance of the dataset based on the write operation having previously been applied to the data location.

In some examples, providing module 112 may provide storage access for each node within the testing cluster to a corresponding partition within the plurality of partitions without copying the copied instance of the dataset to the testing cluster by exporting, for each given partition within the plurality of partitions, data objects that fall within the given partition as a corresponding distributed file system share and mounting the corresponding distributed file system share at a corresponding node within the testing cluster.

In some examples, one or more of the systems described herein (e.g., providing module 112 and/or an execution module) may execute a test application that uses the testing instance of the dataset. For example, providing module 112 may execute a test application that performs tests to evaluate a primary application that operates on and/or will operate on the production cluster (and, e.g., consumes and/or will consume the primary instance of the dataset). For example, the test application may perform unit testing, integration testing, and/or system testing using the testing instance of the dataset. In some examples, providing module 112 may provide a test and development environment to the test application that is functionally equivalent to the production environment—e.g., by providing the testing cluster (e.g., that uses the same configuration as the production cluster, including the same distributed database management system, except that the testing cluster may be scaled down relative to the production cluster), providing the testing instance of the dataset in a format that would be consumable by a primary application in the production environment, and/or configuring the testing cluster to reflect characteristics of the production cluster. In some examples, the test and development environment may facilitate a programmer to modify a primary application (e.g., to add, modify, and/or fix features of the primary application) and effectively test the modifications outside a live production environment. Additionally or alternatively, the test and development environment may facilitate an administrator to test the effects of updating, patching, and/or reconfiguring the production environment and/or one or more primary applications in the production environment without modifying or burdening the production environment.

As mentioned earlier, in some examples, the copied instance of the dataset may include a snapshot of the primary instance of the dataset taken from the production cluster. In these examples, one or more of the systems described herein may perform a backup of the dataset from the snapshot, thereby performing both the backup and providing the testing instance of the dataset with only one act of reading the dataset from the production cluster and only one act of writing the dataset outside the production cluster. For example, a data copy management appliance may create a snapshot of the primary instance of the data set from the production cluster and a backup system may create a backup from the snapshot. The systems and methods described herein may logically repartition the copied instance of the dataset and present the logically repartition copied instance as a testing instance of the dataset to one or more applications outside the production environment (e.g., testing and development applications), thereby allowing nearly instant provisioning of an instance of the dataset without requiring creating and/or maintaining additional copies of the dataset from the production environment.

In some examples, providing module 112 may provide the testing instance in a manner formatted for the testing cluster. For example, in addition to repartitioning the dataset for the testing instance, providing module 112 may provide files within the dataset to the testing cluster using different file names and/or numberings than are used on the production cluster (e.g., because different cluster configurations may call for different file namings). For example, providing module 112 may create symbolic and/or logical file names that reference files in the copied instance of the dataset such that the symbolic file names match expected file names for use in the testing cluster.

Example system 400 of FIG. 4 may illustrate the operation of providing module 112 in an example environment. In one example, providing module 112 (e.g., operating as a part of testing cluster 408 and/or appliance 450) may provide testing instance 409 to testing cluster 408 by providing storage access for nodes 460 and 470 to partitions 462 and 472, respectively (without, e.g., copying files 412, 414, 422, 424, 432, 434, 442, and 444 to testing cluster 408). For example, providing module 112 may expose partition 462 via a network storage protocol to node 460 and may expose partition 472 via a network storage protocol to node 470 (e.g., such that files 412, 422, 424, and 442 appear to be stored on node 460 from a logical perspective and files 414, 432, 434, and 444 appear to be stored on node 470 from a logical perspective). Testing application 480 may then access testing instance 409 on testing cluster 408.

As explained above in connection with FIGS. 1-5, a NoSQL scale-out high performance database (such as APACHE CASSANDRA) may run on commodity hardware. Production deployments of such scale-out databases may involve 64 nodes or more. Some deployments of such scale-out databases may be much larger (e.g., 75,000 nodes storing over 10 petabytes of data). A scale-out database may partition a dataset among the nodes and assign token ranges to different nodes. The systems described herein may derive tokens by running a hash function over the primary key space of a table. In some examples, a keyspace (or schema) in APACHE CASSANDRA may include a collection of files stored across the APACHE CASSANDRA cluster. The files may include data files and index files that are named and numbered in a particular way. The naming and numbering of the files and the token range may be a function of the number of nodes in the APACHE CASSANDRA cluster. Accordingly, the systems and methods described herein may account for the naming and numbering of the files and the token range when provisioning an M node setup from a dataset on an N node setup (e.g., with fewer nodes).

In one example, systems described herein may include an N node production APACHE CASSANDRA cluster and an M node test and development APACHE CASSANDRA cluster. An intermediate appliance (e.g., a VERITAS VELOCITY appliance) may store the files from the N node cluster. A backup process may run a "nodetool flush" command on each node to flush uncommitted data to stable storage and also execute a "nodetool snapshot" command to take a snapshot of the APACHE CASSANDRA dataset.

In some examples, systems described herein may determine the token range of each node in the N node cluster with a "nodetool describering" command. In one example, this command may reveal the token ranges for a four-node cluster as follows: for "node1", from 4611686018427387904 up to −9223372036854775808; "node2", from −9223372036854775808 up to −4611686018427387904; "node3", from −4611686018427387904 up to 0; "node4", from 0 up to 4611686018427387904. The systems described herein may also determine the token range in the M node cluster. For example, the token ranges for a two-node cluster may result as follows: for "test1", from 0 up to −9223372036854775808; for "test2", from −9223372036854775808 up to 0.

The systems described herein may use the token range information for the clusters to provision the data files according to the token ranges. These systems may also rename and renumber the files according to a naming and numbering scheme specified by APACHE CASSANDRA.

After provisioning the data files, the systems described herein may make the APACHE CASSANDRA system on the M node cluster aware of the dataset available on the nodes using a "nodetool refresh" command.

In some examples, the test and development cluster (e.g., the M node cluster) may run in virtual machines. Additionally or alternatively, the test and development cluster may run in physical machines. The systems described herein may repartition the N node dataset to make the dataset suitable for the M node cluster. The systems may then provision the M node files. For example, where the test and development cluster is run in virtual machines, the systems described herein may encapsulate the node's files from the repartitioned set into a virtual disk (e.g., a data virtual disk) that is attached to the node over the network (e.g., through Network File System (NFS)) from a VERITAS VELOCITY appliance. These systems may also place a locally allocated differencing virtual disk in front of the data virtual disk to absorb writes locally. Where the test and development cluster is run in physical machines, the systems described herein may export the node's files through NFS from a VERITAS VEOLOCITY appliance and allow the cluster on physical machines to mount the NFS share. Additionally or alternatively, the systems described herein may encapsulate the node's files in a virtual disk and export the encapsulated data through iSCSI to the corresponding physical machines.

By applying a distributed database data layout to data already copied to a copy data management appliance, the systems described herein may make distributed database datasets available in environments such as test and development environments and make these datasets instantly usable in a different scaled-down configuration without moving and/or copying the datasets.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for provisioning distributed datasets, at least a portion of the method being performed by a computing device comprising at least one processor, the method comprising:
    identifying a dataset, wherein a production cluster stores a primary instance of the dataset by distributing data objects within the dataset across the production cluster according to a first partitioning scheme that assigns each data object within the dataset to a corresponding node within the production cluster;
    receiving a request for a testing instance of the dataset on a testing cluster, wherein the testing cluster is to distribute storage of data objects across the testing cluster according to a second partitioning scheme that maps data objects to corresponding nodes within the testing cluster;
    locating, in response to the request, a copied instance of the dataset that is derived from the primary instance of the dataset and that is stored outside both the production cluster and the testing cluster;
    partitioning the copied instance of the dataset according to the second partitioning scheme, thereby generating a plurality of partitions of data objects that map to corresponding nodes within the testing cluster; and
    providing the testing instance of the dataset in response to the request by providing storage access for each node within the testing cluster to a corresponding partition within the plurality of partitions without copying the copied instance of the dataset to the testing cluster.

2. The computer-implemented method of claim 1, further comprising executing a test application that uses the testing instance of the dataset.

3. The computer-implemented method of claim 1, wherein providing the testing instance of the dataset comprises providing the testing cluster with access to the dataset without providing the testing cluster with access to the production cluster.

4. The computer-implemented method of claim 1, wherein the copied instance of the dataset is stored at a copy data management appliance that copied the dataset from the production cluster.

5. The computer-implemented method of claim 1, further comprising:
  receiving, from an application that uses the testing instance of the dataset, a write operation to apply to a data location within the testing instance of the dataset;
  applying the write operation to an intermediate data layer instead of applying the write operation to the copied instance of the dataset;
  receiving, from an application that uses the testing instance of the dataset, a read operation directed to the data location; and
  applying the read operation to the intermediate data layer instead of applying the read operation to the copied instance of the dataset based on the write operation having previously been applied to the data location.

6. The computer-implemented method of claim 1, wherein partitioning the copied instance of the dataset comprises:
  identifying a token space that describes a range of tokens derivable from data objects given a tokening scheme that maps each data object to a corresponding token;
  dividing the token space into a plurality of token space partitions based on a number of nodes within the testing cluster;
  assigning each token space partition to a corresponding node within the testing cluster; and
  determining, for each data object within the copied instance of the dataset, to which token space partition the data object belongs based on a token derived from the data object.

7. The computer-implemented method of claim 1, wherein the copied instance of the dataset comprises a snapshot of the primary instance of the dataset taken from the production cluster.

8. The computer-implemented method of claim 7, further comprising performing a backup of the dataset from the snapshot, thereby performing both the backup and providing the testing instance of the dataset with only one act of reading the dataset from the production cluster and only one act of writing the dataset outside the production cluster.

9. The computer-implemented method of claim 1, wherein providing storage access for each node within the testing cluster to a corresponding partition within the plurality of partitions without copying the copied instance of the dataset to the testing cluster comprises encapsulating, for each given partition within the plurality of partitions, data objects that fall within the given partition in a corresponding virtual disk and attaching the corresponding virtual disk to a corresponding node within the testing cluster.

10. The computer-implemented method of claim 1, wherein providing storage access for each node within the testing cluster to a corresponding partition within the plurality of partitions without copying the copied instance of the dataset to the testing cluster comprises exporting, for each given partition within the plurality of partitions, data objects that fall within the given partition as a corresponding distributed file system share and mounting the corresponding distributed file system share at a corresponding node within the testing cluster.

11. The computer-implemented method of claim 1, wherein:
  the dataset comprises a subset of a total dataset stored by the production cluster; and
  identifying the dataset comprises applying a selection criterion to the total dataset.

12. A system for provisioning distributed datasets, the system comprising:
  an identification module, stored in memory, that identifies a dataset, wherein a production cluster stores a primary instance of the dataset by distributing data objects within the dataset across the production cluster according to a first partitioning scheme that assigns each data object within the dataset to a corresponding node within the production cluster;
  a receiving module, stored in memory, that receives a request for a testing instance of the dataset on a testing cluster, wherein the testing cluster is to distribute storage of data objects across the testing cluster according to a second partitioning scheme that maps data objects to corresponding nodes within the testing cluster;
  a location module, stored in memory, that locates, in response to the request, a copied instance of the dataset that is derived from the primary instance of the dataset and that is stored outside both the production cluster and the testing cluster;
  a partitioning module, stored in memory, that partitions the copied instance of the dataset according to the second partitioning scheme, thereby generating a plurality of partitions of data objects that map to corresponding nodes within the testing cluster;
  a providing module, stored in memory, that provides the testing instance of the dataset in response to the request by providing storage access for each node within the testing cluster to a corresponding partition within the plurality of partitions without copying the copied instance of the dataset to the testing cluster; and
  at least one physical processor configured to execute the identification module, the receiving module, the location module, the partitioning module, and the providing module.

13. The system of claim 12, further comprising an execution module, stored in memory, that executes a test application that uses the testing instance of the dataset.

14. The system of claim 12, wherein the providing module provides the testing instance of the dataset by providing the testing cluster with access to the dataset without providing the testing cluster with access to the production cluster.

15. The system of claim 12, wherein the copied instance of the dataset is stored at a copy data management appliance that copied the dataset from the production cluster.

16. The system of claim 12, further comprising an execution module, stored in memory, that:
  receives, from an application that uses the testing instance of the dataset, a write operation to apply to a data location within the testing instance of the dataset;
  applies the write operation to an intermediate data layer instead of applying the write operation to the copied instance of the dataset;
  receives, from an application that uses the testing instance of the dataset, a read operation directed to the data location; and applies the read operation to the intermediate data layer instead of applying the read operation to the copied instance of the dataset based on the write operation having previously been applied to the data location.

17. The system of claim 12, wherein the partitioning module partitions the copied instance of the dataset by:
identifying a token space that describes a range of tokens derivable from data objects given a tokening scheme that maps each data object to a corresponding token;
dividing the token space into a plurality of token space partitions based on a number of nodes within the testing cluster;
assigning each token space partition to a corresponding node within the testing cluster; and
determining, for each data object within the copied instance of the dataset, to which token space partition the data object belongs based on a token derived from the data object.

18. The system of claim 12, wherein the copied instance of the dataset comprises a snapshot of the primary instance of the dataset taken from the production cluster.

19. The system of claim 18, further comprising a performing module, stored in memory, that performs a backup of the dataset from the snapshot, thereby performing both the backup and provide the testing instance of the dataset with only one act of reading the dataset from the production cluster and only one act of writing the dataset outside the production cluster.

20. A non-transitory computer-readable medium comprising one or more computer-readable instructions that, when executed by at least one processor of a computing device, cause the computing device to:
identify a dataset, wherein a production cluster stores a primary instance of the dataset by distributing data objects within the dataset across the production cluster according to a first partitioning scheme that assigns each data object within the dataset to a corresponding node within the production cluster;
receive a request for a testing instance of the dataset on a testing cluster, wherein the testing cluster is to distribute storage of data objects across the testing cluster according to a second partitioning scheme that maps data objects to corresponding nodes within the testing cluster;
locate, in response to the request, a copied instance of the dataset that is derived from the primary instance of the dataset and that is stored outside both the production cluster and the testing cluster;
partition the copied instance of the dataset according to the second partitioning scheme, thereby generating a plurality of partitions of data objects that map to corresponding nodes within the testing cluster; and
provide the testing instance of the dataset in response to the request by providing storage access for each node within the testing cluster to a corresponding partition within the plurality of partitions without copying the copied instance of the dataset to the testing cluster.

* * * * *